United States Patent
Hu

(10) Patent No.: US 8,731,035 B2
(45) Date of Patent: May 20, 2014

(54) CABLE MODEM AND RANGING METHOD

(75) Inventor: Jyh-Ding Hu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 334 days.

(21) Appl. No.: 13/115,072

(22) Filed: May 24, 2011

(65) Prior Publication Data

US 2012/0213258 A1   Aug. 23, 2012

(30) Foreign Application Priority Data

Feb. 21, 2011  (CN) .......................... 2011 1 0041518

(51) Int. Cl.
*H04B 3/46*    (2006.01)
*H04B 17/00*   (2006.01)

(52) U.S. Cl.
USPC ........................................ 375/224; 375/222

(58) Field of Classification Search
CPC . H04L 12/12; H04L 12/2801; H04L 43/0817; H04J 3/0682; Y02B 60/34
USPC ........................ 375/219, 222, 224, 257, 259
See application file for complete search history.

(56) References Cited

U.S. PATENT DOCUMENTS

| 6,289,057 | B1 | 9/2001 | Velez et al. |
| 6,690,655 | B1 * | 2/2004 | Miner et al. .................. 370/278 |
| 6,742,186 | B1 * | 5/2004 | Roeck ............................ 725/111 |
| 6,785,564 | B1 * | 8/2004 | Quigley et al. ............... 455/574 |
| 2002/0141544 | A1 * | 10/2002 | Brown et al. .............. 379/29.01 |
| 2007/0218861 | A1 * | 9/2007 | Walston ..................... 455/343.4 |

* cited by examiner

*Primary Examiner* — David B. Lugo
(74) *Attorney, Agent, or Firm* — Novak Druce Connolly Bove + Quigg LLP

(57) ABSTRACT

A cable modem executes periodic ranging with a cable modem terminal system and records a time point at which the periodic ranging is completed. The cable modem obtains an un-ranging time interval during which the cable modem terminal system permits the cable modem not to execute periodic ranging with the cable modem terminal system, and sets a sleep time interval during which the cable modem does not execute periodic ranging with the cable modem terminal system according to the un-ranging time interval. Then, the cable modem shuts off a power amplifier in the cable modem in the sleep time interval if the cable modem does not transmit packets during the preset time interval before the recorded time point.

16 Claims, 4 Drawing Sheets

CABLE MODEM AND RANGING METHOD

BACKGROUND

1. Technical Field

Embodiments of the present disclosure relate to cable modems, and more particularly to a ranging method of a cable modem.

2. Description of Related Art

Before allowing a computer to access the Internet, a cable modem needs to start up and connect to a cable modem terminal system (CMTS). This process can take a while. Thus, most computers are shut off when users complete using the computers, while cable modems are kept to be working to be used anytime.

Usually, most cable modems cannot be used 24 hours a day. Actually, most cable modems are only used during a particular time interval, such as from 6 pm to 10 pm a day. Once at work, the cable modems requires periodically executing ranging with the CMTS to keep communication with the CMTS every a few seconds, which wastes power.

However, if the cable modems are shut off when the cable modem is not at work, the cable modems will disconnect to the CMTS. Thus, this start-up process decreases satisfaction of the users. There remains a heretofore unaddressed need to overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated over, software code modules executed by one or more general purpose computers or processors. The code modules may be stored in any type of computer-readable medium or other storage device. Some or all of the methods may alternatively be embodied in specialized computer hardware or communication apparatus.

Figure 1:
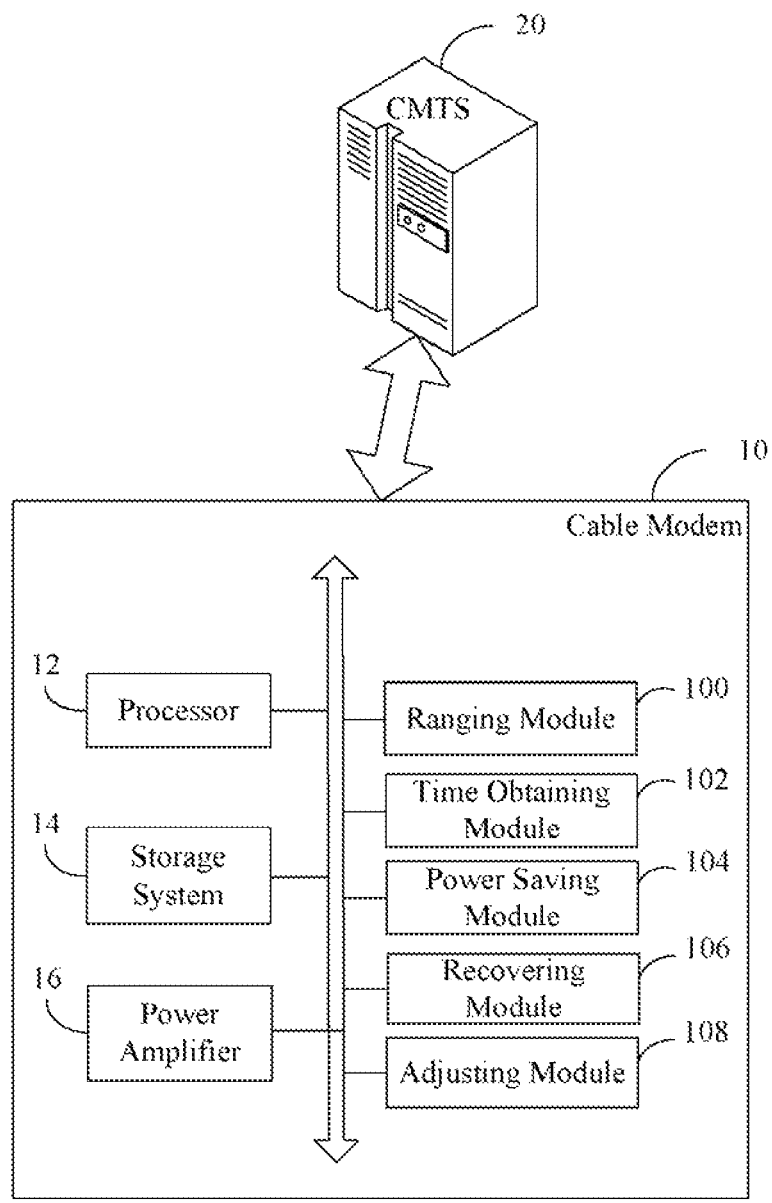
FIG. 1 is a schematic diagram of environment and functional modules of a cable modem of one embodiment of the present disclosure.

FIG. 1 is a schematic diagram of application environment and functional modules of a cable modem 10 of one embodiment of the present disclosure. The cable modem 10 communicates with a cable modem terminal system (CMTS) 20 and accesses the Internet by the CMTS 20.

Figure 2:
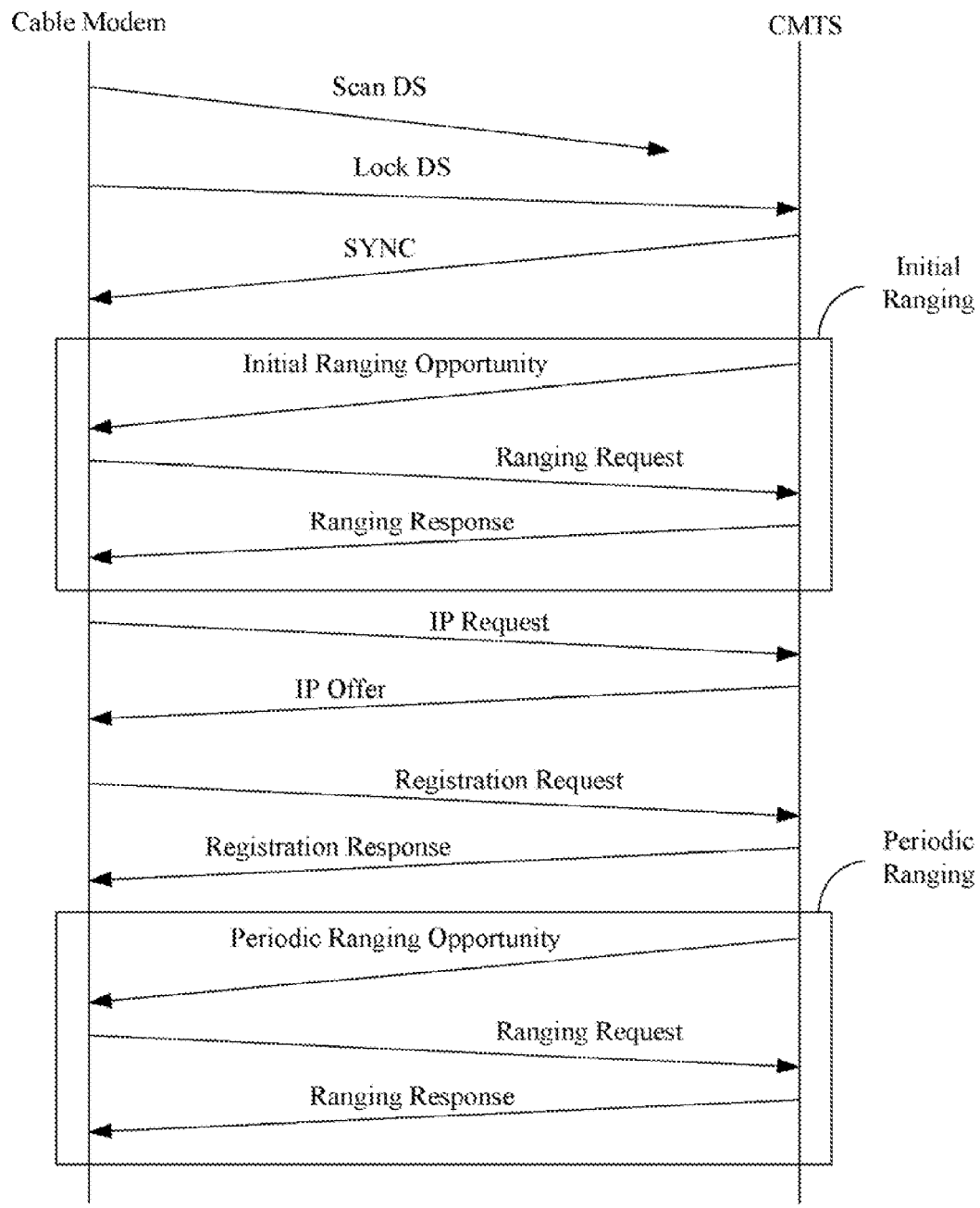
FIG. 2 illustrates communication between the cable modem and a cable modem terminal system of FIG. 1 when the cable modem starts up.

FIG. 2 illustrates communication between the cable modem 10 and the CMTS 20 of FIG. 1 when the cable modem 10 starts up. In one embodiment, the cable modem 10 scans downstream channels to the CMTS 20 and locks available downstream channels. Then, the cable modem 10 synchronizes (SYNC) with the CMTS 20, and then executes initial ranging with the CMTS 20. Here, ranging is a generic term indicating a necessary process which is executed by the cable modem 10 to establish communication with the CMTS 20. It should be noted that ranging includes two kinds, namely initial ranging and periodic ranging. The initial ranging is a first ranging which is executed during the cable modem 10 starts up. The periodic ranging is periodically executed after the cable modem 10 starts up and during the cable modem 10 is at work.

After the initial ranging is completed, the cable modem 10 requests an Internet protocol (IP) address from the CMTS 20. The CMTS 20 distributes an Internet protocol addresses to the cable modem 10. The cable modem 10 receives the distributed the IP address to access the Internet. After receiving the IP address, the cable modem 10 registers to the CMTS 20 to get information from the CMTS 20. After the register, the cable modem 10 enters a work status.

When entering the work status, the cable modem 10 executes the periodic ranging. In detail, the CMTS 20 periodically transmits a periodic ranging opportunity message (shown in FIG. 2) to notify the cable modem 10 to execute ranging with the CMTS 20 every a predetermined time interval, such as five seconds. Usually, an original cable modem executes ranging with the CMTS 20 immediately after receiving the periodic ranging opportunity message. That is, if the predetermined time interval is five seconds, an original cable modem executes periodic ranging with the CMTS 20 every five seconds.

It should be understood that here is an un-ranging time interval during which the CMTS permits the cable modem not to execute periodic ranging with the CMTS 20. The un-ranging time interval is a constant preset by the CMTS 20. The CMTS 20 considers the cable modem 10 to be disconnected if the cable modem 10 has not executed periodic ranging with the CMTS 20 during the un-ranging time interval. Then, the cable modem 10 needs to start up again.

In one embodiment, the cable modem 10 includes a processor 12, a storage system 14, a power amplifier 16, a ranging module 100, a time obtaining module 102, a power saving module 104, a recovering module 106, and an adjusting module 108.

The above modules 100-108 may comprise one or more software programs in the form of computerized codes that are stored in the storage system 14. The computerized codes include instructions that are executed by the processor 12 to provide functions for those modules 100-108. In one embodiment, the storage system 14 includes a synchronous dynamic random access memory (SDRAM), a hard disk, and other kinds of hardware in which data can be stored.

In one embodiment, the ranging module 100 executes periodic ranging with the CMTS 20 and records a time point at which the periodic ranging is completed. In detail, the ranging module 100 receives the periodic ranging opportunity message from the CMTS 20, transmits a ranging request message to the CMTS 20 to request ranging with the CMTS 20, and receives a ranging response message from the CMTS 20. In one embodiment, the ranging response message comprises the un-ranging time interval.

The time obtaining module 102 obtains the un-ranging time interval from the ranging response message. Then, the time obtaining module 102 sets a sleep time interval during which the cable modem 10 does not execute ranging with the CMTS 20 according to the un-ranging time interval. In one embodiment, the sleep time interval is set as less than a difference between the un-ranging time interval and the predetermined time interval.

For example, if the un-ranging time interval is 30 seconds, the predetermined time interval 5 seconds, then, the time obtaining module 102 may set the sleep time interval as 10 seconds, 15 seconds, or any other value which is less than 25 seconds which is equal to the different of 30 seconds and 5 seconds. If the un-ranging time interval is 300 seconds, the predetermined time interval 5 seconds, then, the time obtaining module 102 may set the sleep time interval as 200 seconds, 250 seconds, or any other value.

The power saving module 104 determines if the cable modem 10 transmits packets during a preset time interval before the recorded point time. If the cable modem 10 does not transmit packets during the preset time interval before the recorded point time, which indicates the cable modem 10 is idle rather than working, then, the power saving module 104 shuts off the power amplifier 16 in the sleep time interval to save power.

The recovering module 106 determines if a time interval elapsing after the recorded point time is longer than the sleep time interval. The recovering module 106 wakes up the power amplifier 16 to execute next periodic ranging with the CMTS 20 if the time interval elapsing after the recorded point time is longer than the sleep time interval. Then, the cable modem 10 executes periodic ranging with the CMTS 20 at least once during the un-ranging time interval, which avoids to be required connecting to the CMTS 20 again.

Then, the cable modem 10 continues to shut off the power amplifier 16 in the sleep time interval according to determination result of the power saving module 104, and to wake up the power amplifier 16 to execute next periodic ranging with the CMTS 20 according to determination result of the recovering module 106. Therefore, the cable modem 10 of the present disclosure can shut off the power amplifier 16 in the sleep time interval to save power when the cable modem 10 is not at work, and also can execute periodic ranging with the CMTS 20 to keep communication with the CMTS 20 all the time.

Sometimes, the sleep time interval can be adjusted to be more available. The adjusting module 108 adjusts the sleep time interval after first periodic ranging is executed. In detail, the adjusting module 108 determines if last periodic ranging with the CMTS 20 is successfully executed. The adjusting module 108 increases the sleep time interval if last periodic ranging with the CMTS 20 is successfully executed. In one embodiment, to increase the sleep time interval, the adjusting module 108 adding integer times of the predetermined time interval to the sleep time interval.

The adjusting module 108 decreases the sleep time interval if last periodic ranging with the CMTS 20 is unsuccessfully executed. In one embodiment, to decrease the sleep time interval, the adjusting module 108 subtracting integer times of the predetermined time interval from the sleep time interval.

Figure 3:
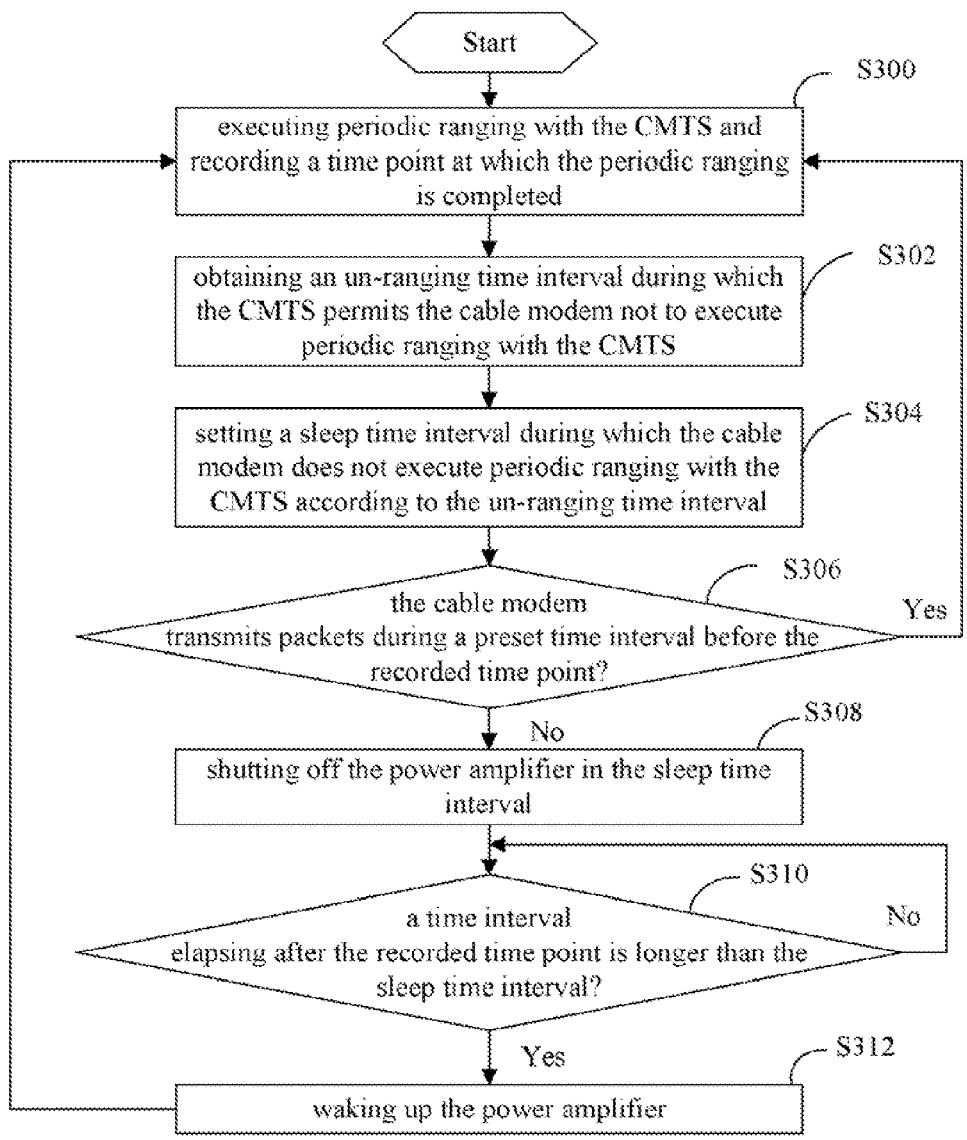
FIG. 3 is a flowchart of a cable modem ranging method of one embodiment of the present disclosure.

FIG. 3 is a flowchart of a cable modem ranging method of one embodiment of the present disclosure. The flowchart is executed by the modules of the cable modem 10 of FIG. 1 after the cable modem enters to the work status. Depending on the embodiment, additional blocks may be added, others deleted, and the ordering of blocks may be changed while remaining well within the scope of the disclosure.

In block S300, the ranging module 100 executes periodic ranging with the CMTS 20 and records a time point at which the periodic ranging is completed. In detail, the ranging module 100 receives a periodic ranging opportunity message from the CMTS 20, transmits a ranging request message to the CMTS 20 to request ranging with the CMTS 20, and receives a ranging response message from the CMTS 20. In one embodiment, the ranging response message comprises the un-ranging time interval during which the CMTS 20 permits the cable modem not to execute periodic ranging with the CMTS 20.

In block S302, the time obtaining module 102 obtains the un-ranging time interval according to the ranging response message. In block S304, the time obtaining module 102 sets a sleep time interval during which the cable modem 10 does not execute periodic ranging with the CMTS 20 according to the un-ranging time interval. The CMTS 20 periodically transmits the periodic ranging opportunity message every a predetermined time interval. In one embodiment, the sleep time interval is set as less than a difference between the un-ranging time interval and the predetermined time interval.

In block S306, the power saving module 104 determines if the cable modem 10 transmits packets during a preset time interval before the recorded point time. If the cable modem 10 does not transmit packets during the preset time interval before the recorded point time, then in block S308, the power saving module 104 shuts off the power amplifier 16 in the sleep time interval to save power.

In block S310, the recovering module 106 determines if a time interval elapsing after the recorded point time is longer than the sleep time interval. If the time interval elapsing after the recorded point time is longer than the sleep time interval, then in block S312, the recovering module 106 wakes up the power amplifier 16 to execute next periodic ranging with the CMTS 20.

Figure 4:
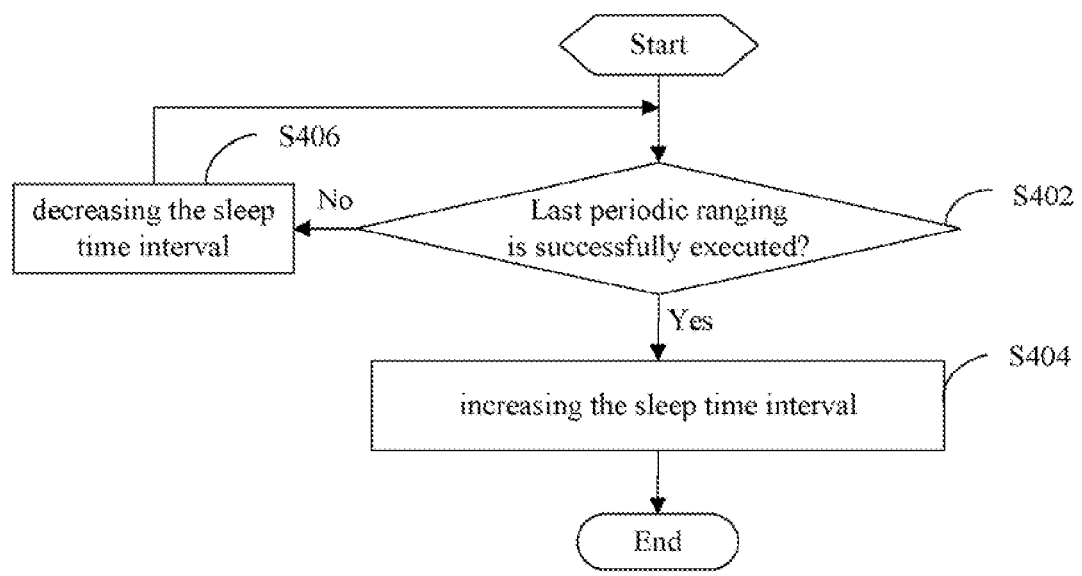
FIG. 4 is a flowchart of a cable modem adjusting a sleep time interval of one embodiment of the present disclosure.

FIG. 4 is a flowchart of the cable modem 10 adjusting the sleep time interval of one embodiment of the present disclosure. The flowchart is executed by the modules of the cable modem 10 of FIG. 1 after first periodic ranging is executed by the ranging module 100. Depending on the embodiment, additional blocks may be added, others deleted, and the ordering of blocks may be changed while remaining well within the scope of the disclosure.

In block S402, the adjusting module 108 determines if last periodic ranging with the CMTS 20 is successfully executed.

If last periodic ranging with the CMTS 20 is successfully executed, then, in block S404, the adjusting module 108 increases the sleep time interval. In one embodiment, to increase the sleep time interval, the adjusting module 108 adds integer times of the predetermined time interval to the sleep time interval.

If last periodic ranging with the CMTS 20 is unsuccessfully executed, then, in block S406, the adjusting module 108 decreases the sleep time interval. In one embodiment, to decrease the sleep time interval, the adjusting module 108 subtracts integer times of the predetermined time interval from the sleep time interval.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A cable modem in communication with a cable modem terminal system, comprising:
   a power amplifier;
   a processor; and
   a storage system storing one or more software programs in the form of computerized codes operable to be executed by the processor, the one or more software programs comprising:
      a ranging module that executes periodic ranging with the cable modem terminal system, and records a time point at which the periodic ranging is completed;
      a time obtaining module that obtains an un-ranging time interval during which the cable modem terminal system permits the cable modem not to execute periodic ranging with the cable modem terminal system, and sets a sleep time interval during which the cable modem does not execute periodic ranging with the cable modem terminal system according to the un-ranging time interval; and a power saving module that determines if the cable modem transmits packets during a preset time interval before the recorded time point, and shuts off the power amplifier in the sleep time interval if the cable modem does not transmit packets during the preset time interval before the recorded time point.

2. The cable modem as claimed in claim 1, further comprising a recovering module that determines if a time interval elapsing after the recorded time point is longer than the sleep time interval, and wakes up the power amplifier to execute next periodic ranging with the cable modem terminal system if the time interval elapsing after the recorded time point is longer than the sleep time interval.

3. The cable modem as claimed in claim 1, wherein the ranging module further receives a periodic ranging opportunity message from the cable modem terminal system, transmits a ranging request message to the cable modem terminal system to request ranging with the cable modem terminal system, and receives a ranging response message comprising the un-ranging time interval from the cable modem terminal system.

4. The cable modem as claimed in claim 3, wherein the cable modem terminal system periodically transmits the periodic ranging opportunity message every a predetermined time interval, and the sleep time interval is set as less than a difference of the un-ranging time interval and the predetermined time interval.

5. The cable modem as claimed in claim 4, further comprising an adjusting module that determines if last periodic ranging with the cable modem terminal system is successfully executed, and increases the sleep time interval if the last periodic ranging with the cable modem terminal system is successfully executed.

6. The cable modem as claimed in claim 5, wherein the adjusting module increasing the sleep time interval comprising adding integer times of the predetermined time interval to the sleep time interval.

7. The cable modem as claimed in claim 4, further comprising an adjusting module that determines if last periodic ranging with the cable modem terminal system is successfully executed, and decreases the sleep time interval if the last periodic ranging with the cable modem terminal system is unsuccessfully executed.

8. The cable modem as claimed in claim 7, wherein the adjusting module decreasing the sleep time interval comprising subtracting integer times of the predetermined time interval from the sleep time interval.

9. A cable modem ranging method with a cable modem terminal system, the cable modem comprising a power amplifier, the method comprising:

executing periodic ranging with the cable modem terminal system;

recording a time point at which the periodic ranging is completed;

obtaining an un-ranging time interval during which the cable modem terminal system permits the cable modem not to execute periodic ranging with the cable modem terminal system;

setting a sleep time interval during which the cable modem does not execute periodic ranging with the cable modem terminal system according to the un-ranging time interval;

determining if the cable modem transmits packets during a preset time interval before the recorded time point; and shutting off the power amplifier in the sleep time interval if the cable modem does not transmit packets during the preset time interval before the recorded time point.

10. The method as claimed in claim 9, further comprising:

determining if a time interval elapsing after the recorded time point is longer than the sleep time interval; and waking up the power amplifier to execute next periodic ranging with the cable modem terminal system if the time interval elapsing after the recorded time point is longer than the sleep time interval.

11. The method as claimed in claim 9, wherein executing periodic ranging with the cable modem terminal system comprises:

receiving a periodic ranging opportunity message from the cable modem terminal system;

transmitting a ranging request message to the cable modem terminal system to request ranging with the cable modem terminal system; and receiving a ranging response message from the cable modem terminal system, wherein the ranging response message comprises the un-ranging time interval.

12. The method as claimed in claim 11, wherein the cable modem terminal system periodically transmits the periodic ranging opportunity message every a predetermined time interval, and the sleep time interval is set as less than a difference between the un-ranging time interval and the predetermined time interval.

13. The method as claimed in claim 12, further comprising:

determining if last periodic ranging with the cable modem terminal system is successfully executed; and increasing the sleep time interval if the last periodic ranging with the cable modem terminal system is successfully executed.

14. The method as claimed in claim 13, wherein increasing the sleep time interval comprises adding integer times of the predetermined time interval to the sleep time interval.

15. The method as claimed in claim 12, further comprising:

determining if last periodic ranging with the cable modem terminal system is successfully executed; and decreasing the sleep time interval if the last periodic ranging with the cable modem terminal system is unsuccessfully executed.

16. The method as claimed in claim 15, wherein decreasing the sleep time interval comprises subtracting integer times of the predetermined time interval from the sleep time interval.

* * * * *